United States Patent
Luick

(10) Patent No.: US 7,188,130 B2
(45) Date of Patent: Mar. 6, 2007

(54) AUTOMATIC TEMPORARY PRECISION REDUCTION FOR ENHANCED COMPRESSION

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 10/675,427

(22) Filed: Sep. 30, 2003

(65) Prior Publication Data

US 2005/0071598 A1 Mar. 31, 2005

(51) Int. Cl.
*G06F 15/00* (2006.01)
(52) U.S. Cl. .................................... 708/203
(58) Field of Classification Search ............ 708/203, 708/550, 551
See application file for complete search history.

(56) References Cited

U.S. PATENT DOCUMENTS

| | | |
|---|---|---|
| 5,812,817 A | 9/1998 | Hovis et al. |
| 6,249,286 B1 * | 6/2001 | Dyer .......................... 345/419 |
| 6,571,016 B1 * | 5/2003 | Mehrotra et al. ........... 382/236 |
| 2002/0140851 A1 * | 10/2002 | Laksono .................. 348/388.1 |

\* cited by examiner

*Primary Examiner*—Chuong D. Ngo
(74) *Attorney, Agent, or Firm*—Patterson & Sheridan LLP

(57) ABSTRACT

A computer system having data registers for storing uncompressed data, a data queue for storing data to be compressed, a compressor for compressing data in the data queue, and a compression ratio monitor for determining the compression ratio of the compressed data. The computer system also includes a compression control register that holds control information, and a precision reducer for reducing the precision of the data prior to that data being stored in the data queue. The precision reducer responses to control information to reduce the precision of the data such that the resulting reduced precision data can be more efficiently compressed. The control information, and thus the operation of the precision reducer, depends on the compression ratio monitor.

23 Claims, 6 Drawing Sheets

AUTOMATIC TEMPORARY PRECISION REDUCTION FOR ENHANCED COMPRESSION

CROSS-REFERENCE TO RELATED APPLICATIONS

Field of the Invention

The present invention is related to the commonly owned, U.S. patent application Ser. No. 10/675,428, entitled "Adaptive Memory Compression," filed herewith.

BACKGROUND OF THE INVENTION

1. Field of the Invention

The present invention relates to computer memory architectures. More particularly, this invention relates to protecting compressed memories from being filled by automatically and temporarily reducing the precision of numbers such that the numbers can compress more efficiently.

2. Description of the Related Art

Computer memory systems have at least two major problems: there is seldom enough and what memory there is tends to be expensive. Unfortunately, high performance computing, e.g. computer gaming, demands large amounts of fast memory. Indeed, memory is often the most expensive component of many computers.

One way of reducing the cost of memory is to use data compression techniques. When data is compressed, more information can be stored in a given memory space, which makes the memory appear larger. For example, if 1 KB of memory can store 2 KB of uncompressed data, the memory appears to be twice as large as it really is.

One compressed data memory system is taught in U.S. Pat. No. 5,812,817, issued to Hovis et al. on Sep. 22, 1998, and entitled, "Compression Architecture for System Memory Application." That patent teaches memory architectures that store both uncompressed and compressed data. Having both types of data is useful since, in practice, most data accesses are to a relatively small amount of the total data. By storing often accessed data in the uncompressed state, and by storing less frequently accessed data in the compressed state, the teachings of U.S. Pat. No. 5,812,817 can significantly reduce latency problems associated with compressed data.

Computer hardware designers can use the teachings of U.S. Pat. No. 5,812,817 to increase the apparent size of memory. By incorporating a memory of a known size, and by incorporating a compression technique having an assumed minimum compression ratio, a hardware designer can inform others how much apparent memory they can assume is available.

When implementing memory compression on numeric data structures used in real-time applications, e.g., 3D graphics, nondeterministic effects can cause certain data elements to compress poorly. Poor compression can cause the achieved compression ratio to fall below the assumed apparent memory, which, in turn, can cause the logical storage space to fall below that required by application software. If the problem becomes bad enough deallocation of real-time data that is required by the application software may be necessary.

A prior art approach that addresses the problem of poor compression is to use an extremely conservative minimum compression ratio assumption. While effective in preventing deallocation of real-time data, that approach artificially reduces the size of the memory that software designers can use.

Since hardware designers recognize problems associated with filled memory, they can provide a hardware flag that signals operating software that memory might be filling up. The technique of using hardware to signal software is termed trapping to software. Trapping because of filling memory provides software an opportunity to protect data or to take other protective action before a full condition occurs. In some applications, the software can simply store data in alternative memory devices, such as on an optical disk, or the software can dump unneeded data, such as a previous display screen, to free up more memory. However, in real-time applications such as computer gaming these approaches can be unacceptable. Storing to an optical disk dramatically increases latency issues, while dumping a previous display is not a viable option since the display will very likely be required again. Either approach causes serious display problems, and computer gamers do not like display problems.

Therefore, a technique, apparatus, and method of avoiding full compressed memory would be useful. In particular, a technique, apparatus, and method of avoiding full memory in compressed systems and that avoids or mitigates latency issues would be highly useful.

SUMMARY OF THE INVENTION

The present invention provides for compressed memory systems in which memory filling is detected and addressed to prevent, delay, or mitigate a full condition and data loss. A compressed memory system that is in accord with the principles of the present invention takes steps automatically to avoid loss of data while mitigating latency problems.

A computer system that is in accord with the principles of the present invention has data registers for storing uncompressed data, a data queue for storing data that is to be compressed, a compressor for compressing the data in the data queue, and a compression ratio monitor for determining the compression ratio of the compressed data. The computer system further includes a compression control register for holding control information, and a precision reducer for reducing the precision of data prior to that data being compressed and then stored in the data queue. The precision reducer responses to control information to reduce the precision of data such that the resulting reduced precision data can be more efficiently compressed. The operation of the precision reducer depends on the compression ratio monitor. Data can be truncated, scaled, or converted.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

The present invention provides a hardware-assisted memory compression architecture that reduces problems associated with memory overflow. Such problems are pronounced in real-time applications such as 3D graphics.

Figure 1:
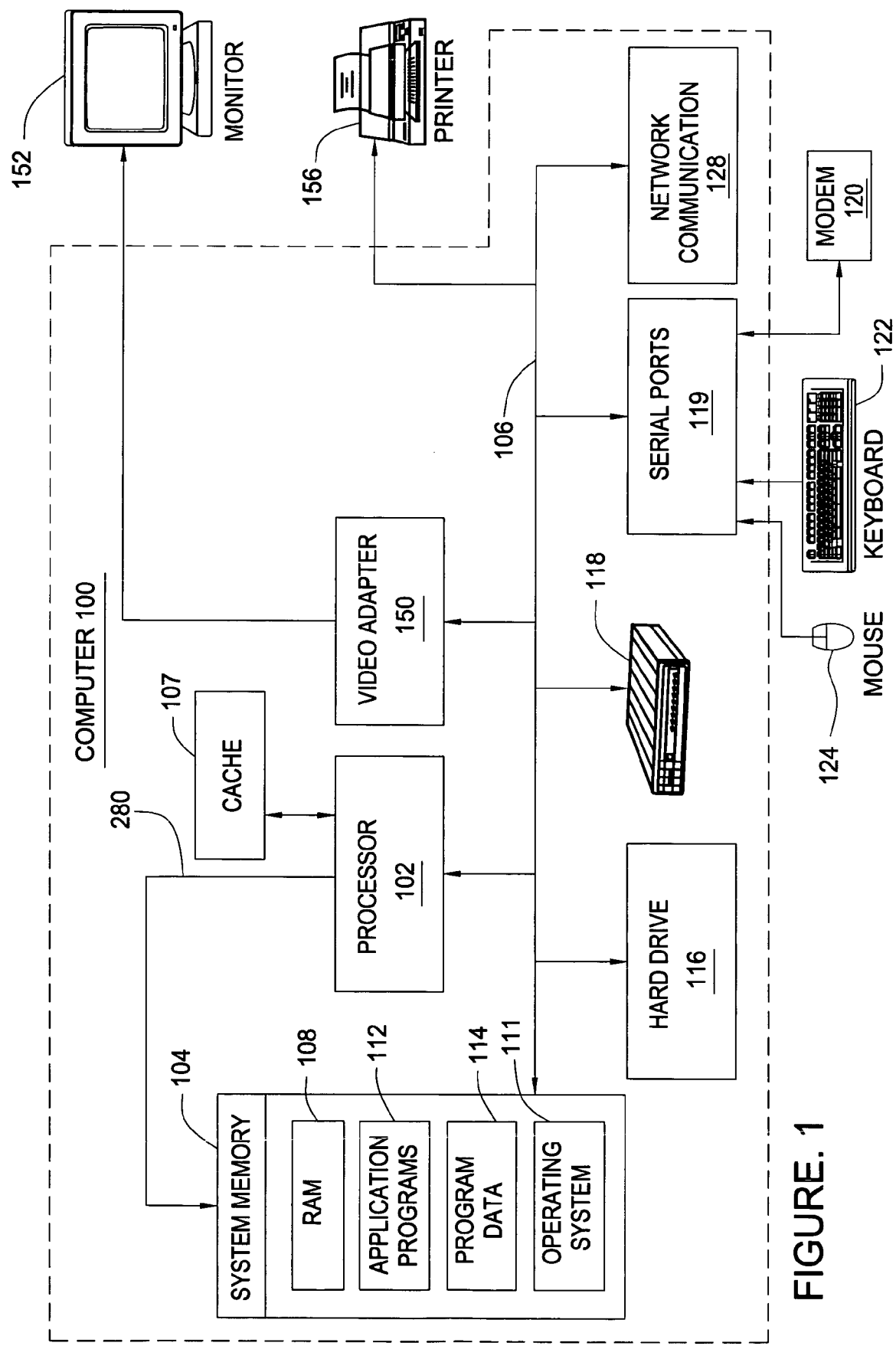
FIG. 1 is a schematic illustration of a computer system that incorporates the principles of the present invention.

FIG. 1 illustrates a computer 100 that incorporates the principles of the present invention. The computer 100 may represent a wide variety of computing devices, such as a conventional desktop computer, server, workstation, gaming device (e.g., a game box), portable or handheld device, network appliance, or any other type computing device. In any case, the compression techniques utilizing temporary precision reduction described herein may be utilized to increase the amount of apparent memory presented to an application and reduce overall system latency.

That computer 100 includes a processor 102 that is connected to a system memory 104 (e.g. RAM) via a system bus 106. The system memory 104 is typically used to store programs including an operating system 111 and one or more application programs 112, and program data 114. The computer 100 also includes a hard drive 116 and/or an optical drive 118 and/or some other type of non-volatile memory for long-term data storage. The computer 100 further includes input/output ports 119 for a modem 120, a keyboard 122, a mouse 124, a network communication system 128, a video adaptor 150 which drives a monitor 152, and a printer 156. The video data should be understood as including a graphics processing system. The computer 100 can be used for all of the normal functions that computers can be used for.

While the computer 100 is shown as having a single system memory 104, in practice that memory can be and usually is distributed over the system and can be specifically associated with any of the computer elements. For example, a high speed cache memory 107 may be attached, integrated with, or otherwise closely associated with the processor 102. Other systems elements such as the printer 156, the video adaptor 150, and any of the other computer elements can also include memory.

Partitioned Memory

The system memory 104 stores two types of data: compressed and uncompressed. Compressed data is highly advantageous from a cost viewpoint because has the effect of providing the processor 102 with a much larger apparent memory capacity than what is physically present, thus enabling more data to be stored in a given memory size. Compression techniques are widely available and well known. As is also well known, compressing data adds to the latency of data accesses. Since most memory accesses are to a relatively small percentage of data within the system memory 104, by leaving often accessed data uncompressed latency problems are reduced.

Figure 2:
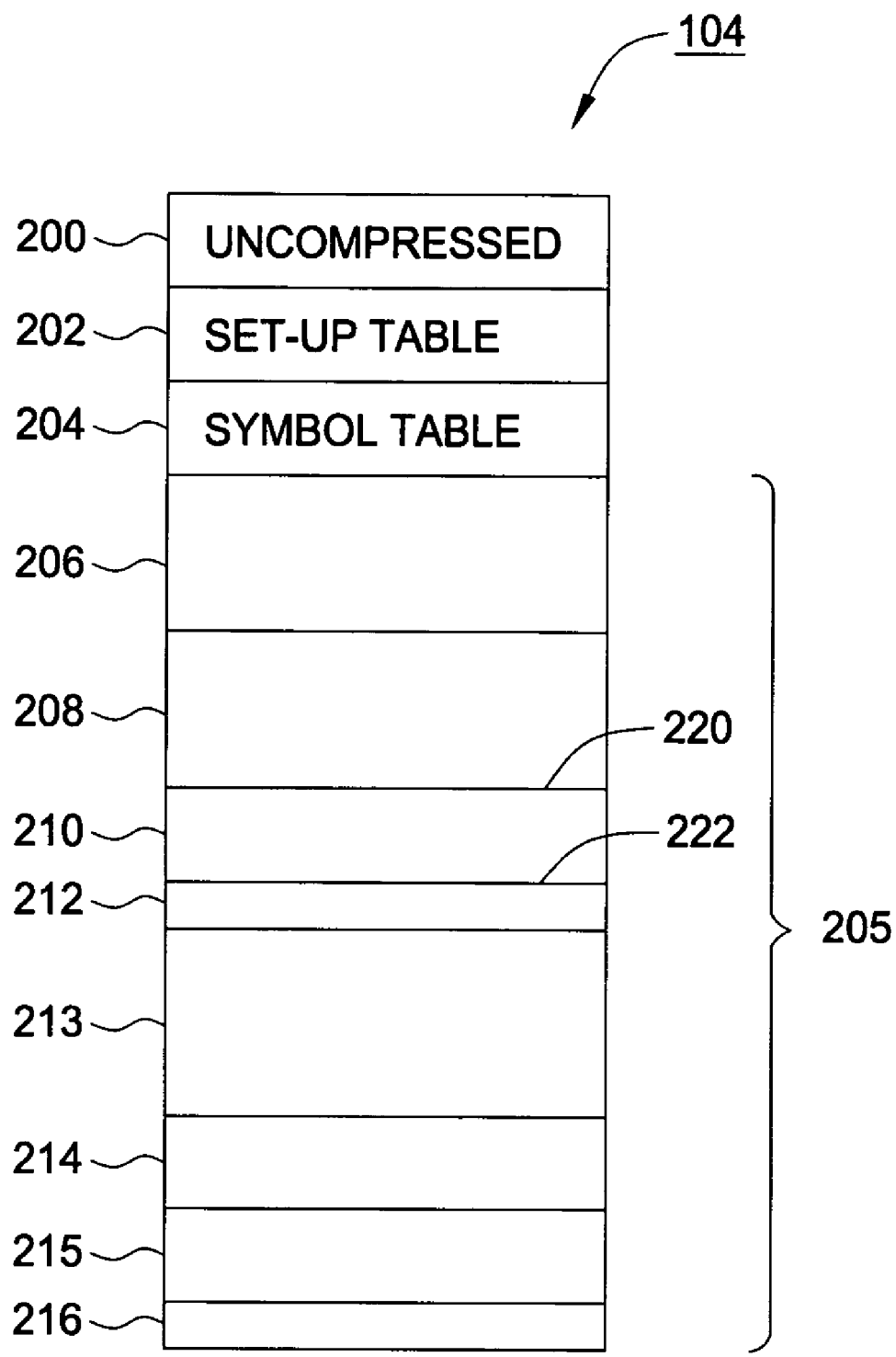
FIG. 2 schematically illustrates a memory device storing both compressed and uncompressed data.

FIG. 2 schematically illustrates an exemplary configuration of the system memory 104. As shown, the system memory 104 is partitioned into an uncompressed section 200, a setup table 202, a symbol table 204, and a compressed section comprised of storage areas 206 through 216. The storage areas 206 through 216 are in general different sizes, with the sizes being related to how efficiently the compression technique can compress specific fixed-length blocks of data. Typically an uncompressed data block is stored in a memory page, with that page having a fixed dimension, e.g., 4096 bytes. The uncompressed section stores frequently referenced data to reduce latency issues. As will be described below with reference to FIG. 3, to further reduce latency, frequently referenced data may also be stored (uncompressed) in cache 107.

The compressed partition of main memory, generally stores less often accessed data (which is compressed). The setup table identifies the locations of compressed data stored within the compressed section. For example, the setup table contains the starting address 220 and ending address 222 of storage area 210. This enables access of the compressed data in the storage area 210. The symbol table includes symbol-to-data transformations used in the compression method. For example, frequently occurring characters (e.g., spaces and zeroes) typically represented by 8-bits, may be represented by a 2-bit symbol. Such symbol tables are usually created during compression (e.g., by scanning for frequently occurring characters) and can result in very efficient data compression.

An Exemplary Processing Architecture

Figure 3:
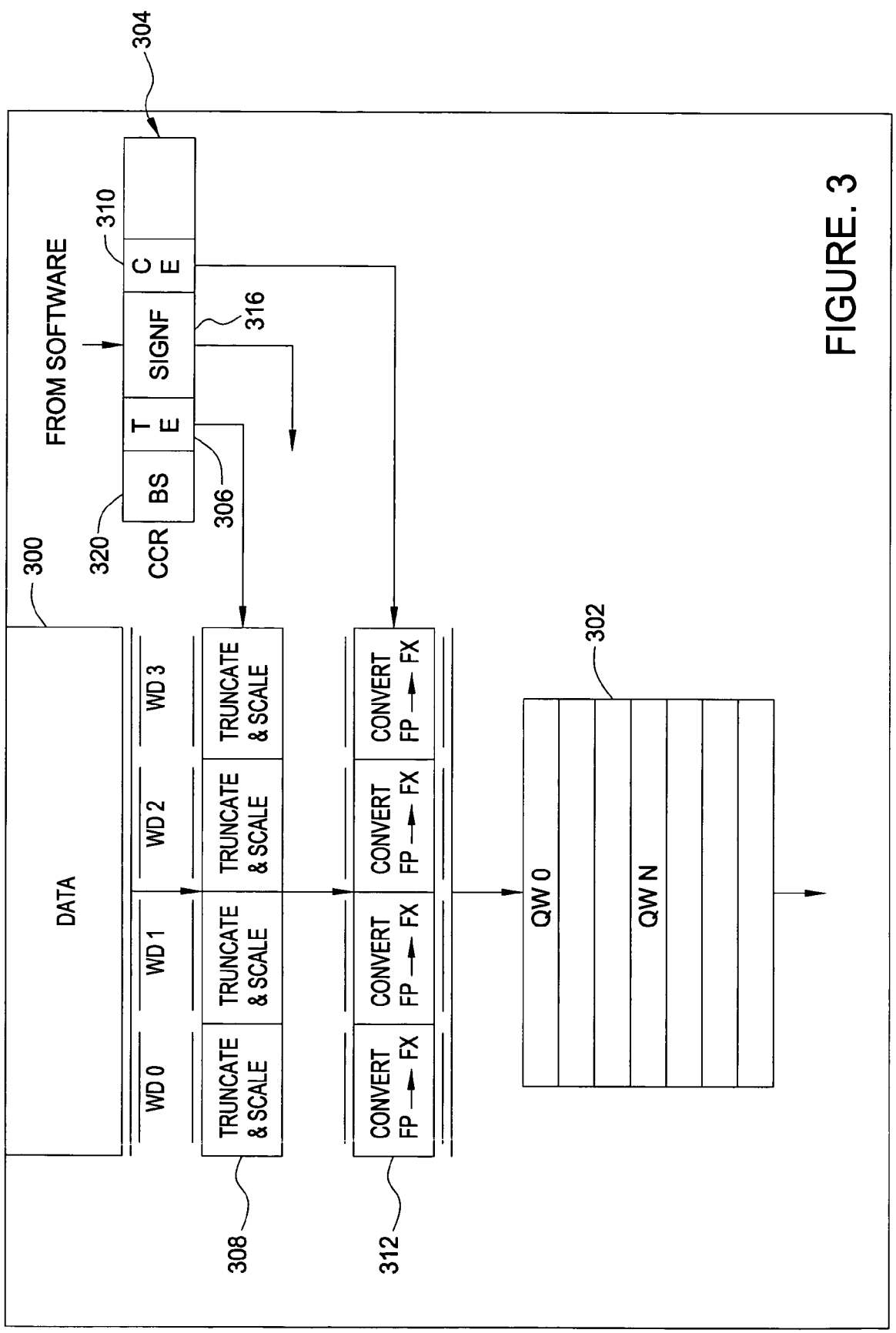
FIG. 3 schematically depicts automatic data type conversion in accordance with the principles of the present invention.

FIG. 3 schematically illustrates a processing architecture of an exemplary processor in which aspects of the present invention may be implemented. For example, the components in FIG. 3 may form a processing pipelined execution unit used to process memory access (e.g., load and store). As illustrated, such pipelines may be fed by one or more register files 300 that store instructions for execution by execution units within a processor.

Accordingly, register files 300 contain data, which might be fixed point, floating point, vector data, or any of the standard data types. In particular, register files 300 that store graphical data from computer gaming applications are contemplated. In gaming applications, for example, the register files 300 will contain data structures that are directed toward graphics, e.g., X, Y, Z pixel coordinates, texture, and color information. As such, much of the graphic data is structured and comprised of data values that do not vary much. For example, the X, Y, Z pixel coordinate values are usually defined as being between −1 and 0. During normal operation when compressed memory is not near full, the data in the register files 300 pass unmodified to a data queue 302 for subsequent compression and storage.

As illustrated, the architecture may also include a truncate and store processing unit 308 and/or convert processing unit 312 configured to perform automatic precision reduction when an enhanced compression mode is enabled. In other words, when the enhanced compression mode is not enabled, data involved in store operations are sent directly to a store data queue 302. When the enhanced compression mode is enabled, however, data resulting from computations may be truncated, scaled, and/or converted prior to being sent to the store data queue 302. Then data is moved from the store data queue to the compressor and from there into the main memory. As illustrated, the truncate and store processing unit 308 and/or convert processing unit 312 may be controlled by bits in a compression control register 304, which may be set to enable enhanced compression mode.

For example, if the compressed memory 205 is approaching full the computer 100, in a manner that is discussed subsequently, changes a compression control register 304 to set a truncate enable bit 306. That bit initiates a truncate and scale process 308 which, in a manner that is discussed below, reduces the precision of the data from the register files 300 in a manner that improves data compression. To that end, the compression control register 304 also includes significant bits 316 that control the number of significant bits to be kept. Additionally, if the compressed memory 205 is even closer to being full, the computer 100, in a manner that is discussed subsequently, changes the content of the compression control register 304 to set a convert enable bit 310. That bit initiates a conversion process 312 that, in a manner that is discussed below, converts floating point data from the register files 300 to integers and then truncates and scales those integers in a manner that improves data compression.

The truncate and scale process 308 and the conversion process 312 reduce the precision of the data from the registers 300 before that data is applied to the data queue 302 for compression. Both processes can be initiated automatically via hardware and the operating system 111 as described subsequently, or possibly by an application program 112. While reduced precision is not desirable in its own right, it can prevent data loss that would occur if the compressed memory 205 fills. Additionally, in applications such as computer gaming reduced precision can be acceptable, at least temporarily. When the compressed memory 205 is no longer near full the truncate and scale process 308 and/or the conversion process 312 may be terminated (e.g., by clearing corresponding bits in the compression control register 304).

It should be noted that when all such conversions, truncations, and scaling have been performed to the data, the width of the data field remains unchanged; i.e., a 32 bit word is simply transformed into another 32 bit word, but one usually with many more zero bits. This size invariance is important for architectural and logical compatibility so that data structures, lengths, and boundaries are totally preserved. The advantage is only derived when this logical data format is compressed; the convert, truncate, and scale processes will simply add many more groups of zero bits into the word which will greatly enhance the resulting compression ratio.

Figure 4:
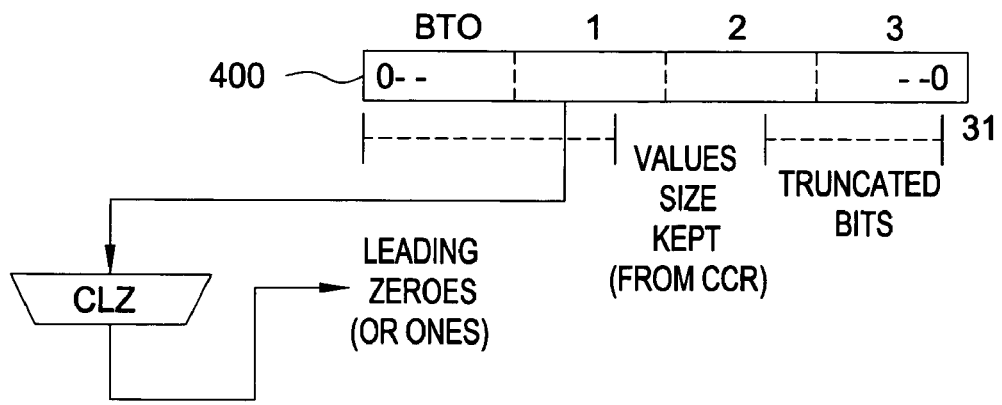
FIG. 4 illustrates truncation and scaling of integer data.

FIG. 4 illustrates how the truncate and scale process 308 operates on integer words. Each integer word 400 is comprised of, for example, four 8-bit bytes, totally 32 bits, which are numbered 0 through 31. In FIG. 4, bit 0 is the most significant bit and bit 31 is the least significant bit. If the integer word value is fairly large it has a leading 1 in one of the more significant bits. In that case the word is truncated by converting all bits below a predetermined bit, say bit 16, to zero (i.e., the last 16 bits of the 32 bit word become zero). The significant bits 316 of the compression control register 304 can be used to control the bit position. This forces a precision reduction, but results in an integer that can be compressed efficiently. However, if the integer word 400 is relatively small its leading 1 will not be in a highly significant bit position. In that case, the integer word is shifted left a fixed number of times to bring the leading 1 into a significant bit position. Then, all bits below the predetermined bit position are set to zero, except for bit position 31. Bit position 31 is set to 1 to designate that the integer word has been left shifted. The left-shifted integer can then be efficiently compressed. The shift amount used for scaling is recorded in the CCR for later recovery.

Figure 5:
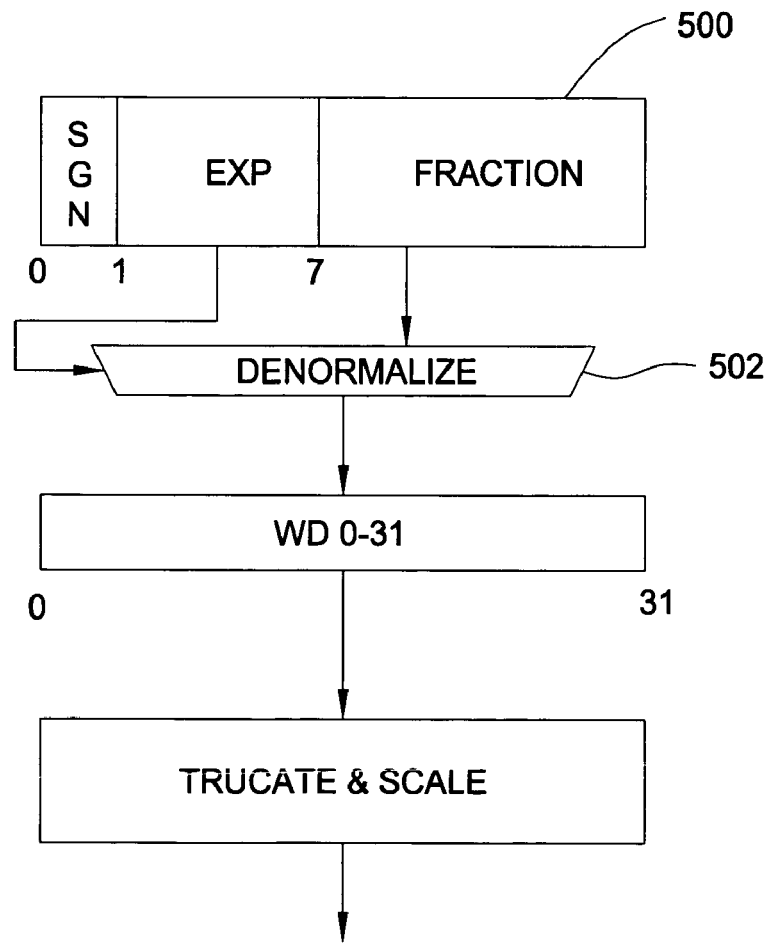
FIG. 5 illustrates conversion, truncation and scaling of floating point data.

FIG. 5 illustrates how the conversion process 312 operates on floating point data. Each floating point word 500 is comprised of, for example, four 8-bit bytes, totally 32 bits which are numbered bits 0 through 31. Bit 0 is a sign bit, the next 7 bits represent the exponent of the floating point word, and the remaining 24 bits represent the fraction part of the floating point word. The conversion process 312 operates when the sign bit is a 1, designating a negative number, and the most significant bit of the fraction, bit position 8 is a 1 (which, according to standard practices of floating point numbers it will be). Conversion begins by denormalizing the integer word 500 in a denormalizer 502. Denormalizing involves shifting the fraction right the number of times represented by the exponent value and incrementing the exponent for each bit shifted. For example, if the exponent holds 4 (and the sign bit is 1), the fractional part is right rotated four times (thus moving the leading 1 to bit position 14.) The sign bit and exponents are then set to zero. The resulting word is then treated as an integer and truncated and scaled as described above. Once converted, the data may be truncated and scaled, as described above.

While the truncate and scale process 308 and the conversion process 312 can be triggered automatically by the operating system, application programs 112 can improve the result by making intelligent decisions regarding compression, based on the type of data being processed. For example, if an application program 112 is a game program the application program can have X, Y, Z coordinates in floating point values that range from −1 to 0. This forces the sign bit to 1 and the exponent to 0. The floating point words can then be applied to the conversion process 312 which will convert the floating point words with minimal loss of precision. Alternatively, the application program can signal what data should be truncated and scaled or converted, and what the scale factor should be. In that manner, the application program can signal what data can be effectively used with reduced precision.

An Exemplary Memory Architecture

Figure 6:
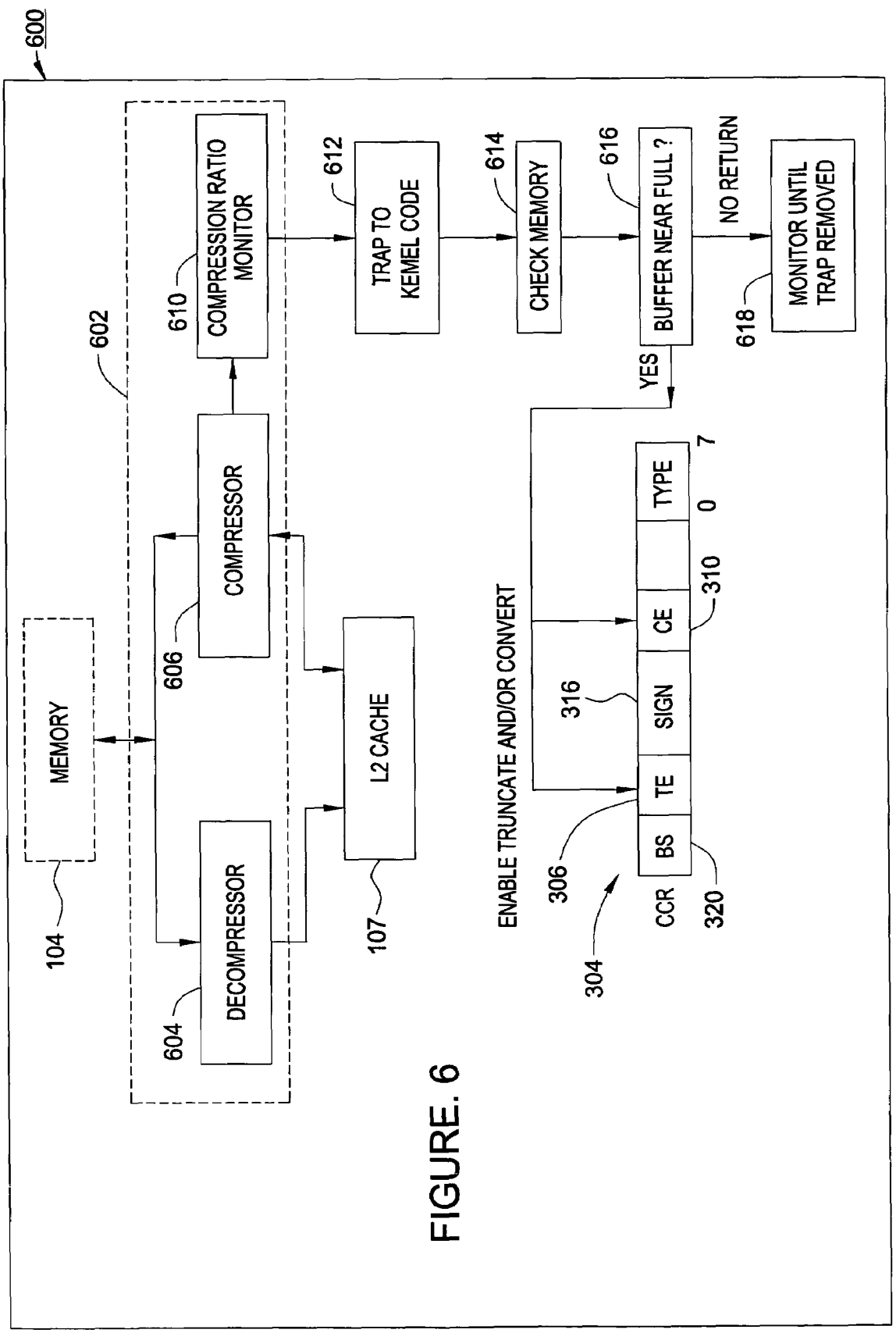
FIG. 6 schematically illustrates the triggering of automatic data type conversion when memory is approaching full.

As previously described with reference to FIG. 3, operation of the enhanced compression mode may be controlled by the content of the compression control register 304, specifically the truncate enable bit 306 and the convert enable bit 310. According to some embodiments, the states of those bits may be set in software, after being notified by hardware that an expected level of compression is not being achieved. For example, FIG. 6 illustrates an exemplary memory architecture with a compression engine configured to modify compression ratio and notify software, by generating a software trap condition, that an expected level of compression is not being achieved. Components of the memory architecture 600 may operate in a manner similar to those described in the co commonly owned, U.S. patent application Ser. No. 10/675,428, entitled "Adaptive Memory Compression," filed herewith, herein incorporated by reference in its entirety.

The memory architecture 600 includes a data compression engine 602 having a decompressor 604 and a compressor 606. The data compression engine 602 is implemented in hardware to improve speed, which reduces latency. The memory architecture 600 also includes the cache memory 107, which is high speed memory that provides working storage registers for the processor 102 (see FIG. 1). When compressed data is required by the processor 102, the compressed data is called from the system memory 104 and applied to the decompressor 604. The decompressor 604 decompresses the compressed data and supplies it to the cache memory 107. In turn, when the cache memory 107 is done with data the cache memory applies that data to the compressor 606. The compressor 606 then compresses that data, which is then stored in the system memory 104.

The compression engine 602 also includes a compression ratio monitor 610 that compares the size of the compressed blocks to the size of the uncompressed blocks (before compression). So long as that comparison shows that data is being compressed at a ratio that provides the operating software with sufficient apparent memory the compression ratio monitor 610 initiates no action. By sufficient apparent memory it is meant that the memory will store at least the amount of data promised by the hardware designers. Thus the computer 100 is suppose to have at least X amount of apparent memory, which is based on a compression ratio of Y. If the compression ratio is greater then Y the computer 100 has sufficient memory to accomplish its tasks and the compression ratio monitor 610 takes no action.

However, if the compression ratio monitor 610 finds that the compression ratio has dropped below the minimum assumed value (Y) then the compression monitor 610 traps to kernel code 612 in the operating system 111. That is, the operating system 111 is hardware notified that the assumed compression ratio is not being achieved and, therefore, the assumed amount (X) of apparent memory may not, in fact, be available. The operating system 111 checks 614 the system memory 104 to determine if a problem exists. If the buffer is not near empty 616, for example if the compression ratio is less then Y, but little data is being stored, then the system memory 104 has significant memory space available. In that case, the operating system 111 takes no other action beyond continuing to monitor 618 the status of the system memory 104 until the compression ratio rises above the minimum assumed value (Y). Periodic checking of the system memory 104 is usually sufficient.

If the operating system 111 determines 616 that the system memory 104 is approaching full, the operating system 111 sets the truncate enable bit 306. This initiates automatic precision reduction of data as explained above. The operating system then continues to monitor the memory until either the hardware trap is removed or the operating system 111 determines that the memory is almost full. If the operating system 111 determines that the compressed memory is no longer in danger of filling, the truncate enable bit 306 is removed and the precision reduction of integers is stopped. However, if the operating system 111 determines that the memory is almost full the operating system 111 sets the convert enable bit 310. This initiates the conversion and precision reduction of floating point data. The operating system 111 then continues to monitor the fill level of the compressed memory. When the compressed memory is no longer almost full, the convert enable bit 310 is cleared. When the compressed memory is no longer in danger of filling the truncate enable bit 306 is cleared. When the hardware trap is removed the operating system 111 no longer monitors the status of the compressed memory.

Exemplary Operations for Automatic Precision Reduction

Figure 7:
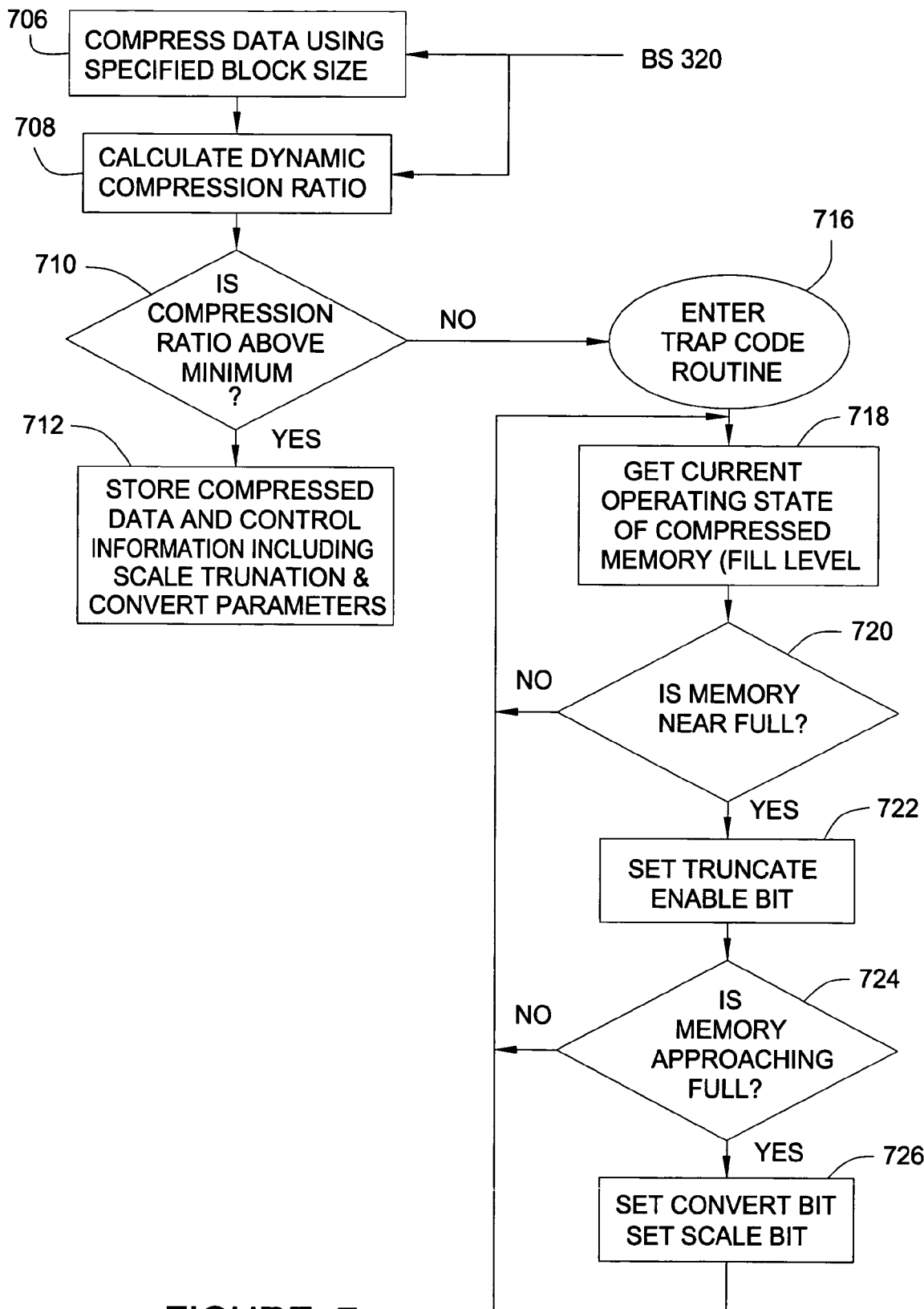
FIG. 7 is a flow diagram of the initiating of automatic data type conversion.

The concepts of hardware-assisted compression via software trapping may be further explained with reference to FIG. 7. The operations 706–712 shown in FIG. 7 are assumed to be performed in hardware when possible, while the operations 716–726 are assumed to be performed in software (e.g., the operating system 111 or an application running thereon).

As described in detail in the previously referenced application Ser. No. 10/675,428, the compression control register 304 may include block size bits BS 320 (see FIGS. 3 and 6) that control the size of the data queue 302 before compression is performed. That information may be applied to the compressor 606 and to the compression ratio monitor 610 (see FIG. 6).

Then, at step 706 the compressor 606 compresses data using the block size specified by the block size bits BS 320 to form compressed blocks that have dimensions that are applied to the compression ratio monitor 610. At step 708 the compression ratio monitor 610, which has available to it both the block size of the uncompressed data (represented by BS 320) and the actual compressed block size, calculates the compression ratio. At step 710, a determination is made as to whether the achieved compression ratio is above the minimum threshold (Y). If so, at step 712 the compressed data and compression control information, which is useful when decompressing, are stored. But, if at step 710 the compression ratio monitor 610 determines that the achieved compression ratio is below the minimum (Y), at step 714 a trap flag is set that informs software that a potential problem exits (the hardware has now trapped to software).

When the trap flag is set, at step 716 the operating system 111 senses the hardware trap (which might be done by either an interrupt or by polling) and jumps to a trap code routine. At step 718, that code routine obtains the current operating state of the compressed memory, particularly its fill level. A decision is then made at step 720 as to whether the compressed memory is near full. If not, the operating system 111 continues to monitor the compressed memory. But, if the compressed memory system is nearing full, at step 722 the operating system 111 sets the truncate enable bit 306. This initiates truncate and scaling of data as explained above. A decision is then made at step 724 as to whether the compressed memory is in immediate danger of filling. If not, the operating system 111 continues to monitor the status of the compressed memory. However, if the compressed memory is in immediate danger of filling, at step 726 the operating system 111 sets the convert enable bit 310. The operating system 111 then continues to monitor the status of the compressed memory, setting and clearing the truncate bit and the convert bit in response to the fill status of the compressed memory. When the trap flag clears the operating system 111 no longer monitors the status of the compressed memory (and the truncate bit and convert bit are cleared as required).

While the foregoing is directed to embodiments of the present invention, other and further embodiments of the invention may be devised without departing from the basic scope thereof, and the scope thereof is determined by the claims that follow.

The invention claimed is:

1. A computer, comprising:
   data registers for storing uncompressed data;
   a data queue for storing data to be compressed;
   a compressor for compressing data in said data queue;
   a compression ratio monitor for determining the compression ratio of compressed data;
   a compression control register for holding control information; and a precision reducer for reducing the precision of data in said data registers and for storing reduced precision data in said data queue;

wherein said precision reducer operates in response to control information;

wherein said precision reducer reduces the precision of data such that the resulting reduced precision data can be more efficiently compressed by said compressor; and wherein said control information depends on said compression ratio monitor.

2. The computer of claim 1, further including a compressed memory for storing compressed data.

3. The computer of claim 2, wherein said compression ratio monitor traps to a software program when said compression ratio drops below a predetermined value.

4. The computer of claim 3, wherein after said compression ratio monitor traps to said software program that software program checks the fill status of said compressed memory.

5. The computer of claim 4, wherein said software program modifies the compression control register such that control information causes said precision reducer to operate when said compressed memory is near full.

6. The computer of claim 5, wherein said software program is an operating system.

7. The computer of claim 5, further including a processor for running an application program.

8. The computer of claim 7, wherein said application program is a computer game.

9. The computer of claim 2, wherein said control information causes said precision reducer to operate when said compressed memory is near full.

10. The computer of claim 1, wherein said precision reducer reduces precision by truncating data by reducing bits to zero.

11. The computer of claim 10, wherein said precision reducer scales data by shifting data to prior to truncating.

12. The computer of claim 1, wherein said precision reducer converts floating point data to integer data by denormalizing the floating point data, wherein said floating point data includes a sign bit, an exponent component, and a fraction component.

13. The computer of claim 12, wherein said denormalizing is performed by shifting data the number of times represented by the exponent component.

14. The computer of claim 13, wherein said precision reducer truncates data when said floating point data represents a negative number.

15. The computer of claim 14, wherein said precision reducer truncates data by reducing bits to zero.

16. The computer of claim 1, wherein said precision reducer operates automatically when said compressed memory is near full.

17. A method of operating a computer, comprising:
storing uncompressed data;
moving uncompressed data into a data queue;
compressing the data in the data queue;
storing the compressed data in a compressed memory;
monitoring the compression ratio after compressing;
reducing the precision of the uncompressed data moved into the data queue when the compression ratio drops below a predetermined level and the compressed memory is near full.

18. The method of claim 17, wherein the step of reducing the precision of the uncompressed data improves the compression efficiency.

19. The method of claim 17, wherein the step of reducing precision includes truncating data by reducing bits to zero.

20. The method of claim 17, wherein the step of reducing precision includes denormalizing floating point data by shifting data the number of times represented by an exponent component.

21. A processor, comprising:
a load data queue;
a truncate and scale processing unit;
a compression control register with one or more bits to enable an enhanced compression mode; and
a load processing unit configured to (i) transfer data involved in a load instruction to the truncate and scale processing unit prior to storing the data in the store data queue, when the enhanced compression mode is enabled, and to (ii) transfer the data to the store data queue bypassing the truncate and scale processing unit when the enhanced compression mode is not enabled.

22. The processor of claim 21, wherein:
the processor further comprises a convert processing unit; and
the load processing unit is further configured to transfer data involved in a load instruction to the convert processing unit prior to the transferring the data to the truncate and scale processing unit, when the enhanced compression mode is enabled.

23. The processor of claim 21, wherein the compression control register is writable by software and comprises one or more bits to control truncate and scale operations performed by the truncate and scale processing unit.

* * * * *